United States Patent [19]

Chen

[11] Patent Number: 4,653,377

[45] Date of Patent: Mar. 31, 1987

[54] BLIND WITH A MUSIC BOX

[76] Inventor: Chih-Chung Chen, 20, Ming Chuan Rd., Pu Lun Li, Lu Kang Chen, Changhua Hsien, Taiwan

[21] Appl. No.: 837,105

[22] Filed: Mar. 4, 1986

[51] Int. Cl.⁴ .......... G01F 1/06

[52] U.S. Cl. .......... 84/94 C; 160/178 R

[58] Field of Search .......... 84/94 C, 95 C; 160/176 R, 178 R

[56] References Cited

U.S. PATENT DOCUMENTS 3,037,415 6/1962 Wyant .......... 84/95 C 3,074,127 1/1963 Ellis .......... 160/176 R X

*Primary Examiner*—L. T. Hix

*Assistant Examiner*—Brian W. Brown

*Attorney, Agent, or Firm*—Browdy and Neimark

[57] ABSTRACT

A blind with a music box includes a control element and a music box both of which are received in a receiving room provided in a top beam of the blind. The control element engages with an adjusting rod of a transmitting device mounted in the beam. Music will be played when a control rod drives the control element to adjust the facing angle of the slats of the blind and to switch on the power source by the rotation of the control rod by means of the adjusting rod. In addition, the power source is mainly a solar battery in combination with an auxiliary mercury cell which serves as the power source when the solar battery is exhausting.

5 Claims, 6 Drawing Figures

BLIND WITH A MUSIC BOX

SUMMARY OF THE INVENTION

The present invention relates to a blind with a music box which plays a reserved music when the facing angle of slats of the blind is adjusted and is power supplied by a solar battery in combination with an auxiliary mercury cell, and more particularly to a blind with a music box which includes a control element and a music box both provided in a receiving room of a top beam of the blind and plays music when the control element is driven by an adjusting rod.

The prior blind is known to include a control device and a control rod both received within a top beam thereof, a plurality of vertically spaced slats below the top beam, which can be overlapped together in an unused condition and evenly distributed in a using condition, and an adjusting rod for adjusting the facing angle of the slats. Such a blind is nearly perfect in sun-shading. Nevertheless, it is preferable that an entertaining effect be added to the blind while one's adjusting the facing angle of the slats of the blind. It is therefore tried by the present applicant to provide a blind so preferred.

SUMMARY OF THE INVENTION

According to one aspect of the present invention, a blind including a top beam receiving therein a music box will play music when its power source is switched on by a control element.

According to further an aspect of the present invention, the control element includes a cam wheel, the inner side of which is provided with a waveform flange for driving a resilient conducting plate to contact a conducting pin for switching on the power source.

According to yet an aspect of the present invention, the power source mainly is a solar battery in parallel with an auxiliary mercury cell which serves as the power source of the music box when the solar battery is exhausting.

The present invention may best be understood with reference to the accompanying drawings, in which:

DETAILED DESCRIPTION

Figure 2:
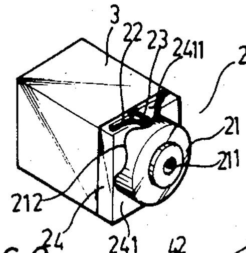
FIG. 2 is a perspective view showing the position-relationship between a control element and a music box of the present invention.
Figure 1:
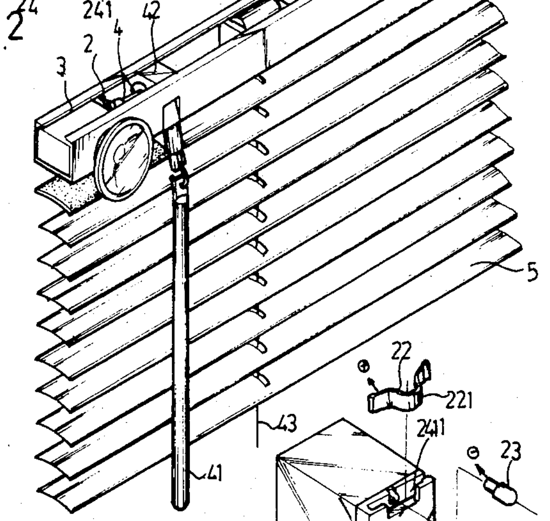
FIG. 1 is a perspective view showing a blind with a music box according to the present invention.

Referring now to FIGS. 1 & 2, a blind with a music box according to the present invention includes a control element 2 and a music box 3 both of which are received in an end of a top beam 1 of the blind, a loud speaker mounted on top beam 1 and electrically connected to music box 3 electrically connected to control element 2 which includes a cam wheel 21, a resilient conducting plate 22 and a conducting pin 23, and a control rod 4 being a prior known member. Control rod 4 controls control element 2 and the turning direction of which is governed by an adjusting rod 41 and a transmitting device 42 in order that a stair-rope 43 of the blind will change the facing angle of the slats 5 of the blind as is well known in the art and will be described no more.

Figure 3:
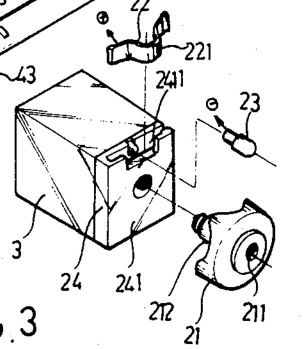
FIG. 3 is an exploded view showing a control element of the present invention.

The main feature of the present invention resides in that in addition to controlling the facing angle of slats 5, control rod 4 drives control element 2 to operate music box 3. An end of control rod 4 is rooted in an axial hole 211 of cam wheel 21 which rotatably engages an outer wall 241 of a securing base 24 having at the top thereof a receiving groove 2411 which receives the generally V-shaped conducting plate 22 which, as complementarily shown in FIG. 3, has a bottom 221 engagable with a waveform guiding flange 212 provided on the inner side of cam wheel 21 and is electrically connectable with conducting pin 23 also disposed on securing base 24 when bottom 221 engages with the peak portion of waveform flange 212. Conducting plate 22 and conducting pin 23 are electrically connected to the internal circuit of music box 3.

Figure 4:
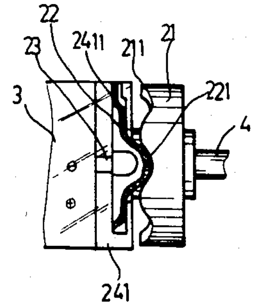
FIG. 4 is a schematic view showing the operation of a control element of the present invention.
Figure 5:
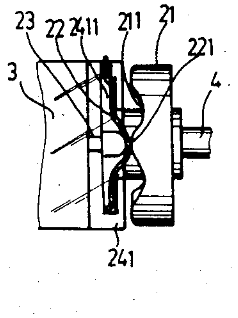
FIG. 5 is further a schematical view illustrating the operation of a control element of the present invention.

Adjusting rod 41 can drive control rod 4 to rotate in oppositte directions. When control rod 4 is driven to rotate in either direction, as shown in FIGS. 4 & 5, waveform flange 212 will inwardly force bottom 221 to contact with conducting pin 23 so as to switch on the power circuit of music box 3 to have the music reserved therein played through the loud speaker. Thus, each time one adjusts the facing angle of the slats of the blind, he can be accompanied by the reserved music in music box 3.

The various designs, internal dispositions and circuits of music box 3 are well within the capability of one skilled in the art, e.g. several songs can be stored in an IC and each time the power circuit of music box 3 is switched on, a song will be played and the power source automatically switches off when said song has been played.

Figure 6:
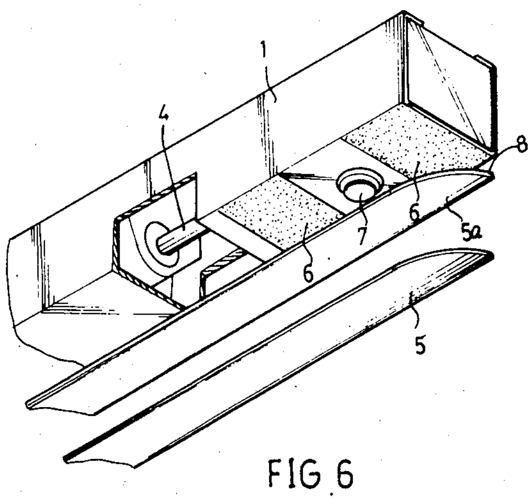
FIG. 6 is a structural view showing a top beam of a blind of the present invention provided with a solar battery.

The power source of music box 3 can be a solar battery in combination with a mercury cell. As shown in FIG. 6, two reflecting sheets 6 are disposed on the bottom of top beam 1 and a solar battery inductor 7 is mounted therebetween. The slat 5*a* which is most nearest to top beam 1 has at the top thereof provided with a reflecting sheet 8 facing toward reflecting sheets 6. With lights between reflecting sheets 6 & 8 occurring reflection, diffusion and refraction therebetween, the solar energy is effectively introduced into solar battery inductor 7. If it is a rainy or cloudy day, the auxiliary mercury cell which is in parallel with the solar battery which now cannot be energized by the solar energy will serve as the power source of music box 3. Such technique can also be found identified in the related art and will not be described further.

In sum, the present invention relates to a blind with a music box which includes a control element and a music box power-supplied by a solar battery in combination with an auxiliary mercury cell and plays music when the facing angle of the slats of the blind is adjusted.

I claim:

1. A blind with a music box comprising: a music box and a control element both of which are received within a top beam of the blind; a transmitting device mounted in said top beams; a control rod connecting said transmitting device and said control element; a plurality of slats disposed beneath said top beam; an adjusting rod engaging with said transmitting device and positioned at the front of said blind; a loudspeaker mounted on said top beam and electrically connected to an internal circuit of said music box electrically connected to said control element so that the music stored in said music box will be played when said control rod is actuated by said transmitting device driven by said adjusting rod to let said control element switch on said internal circuit.

2. A blind with a music box according to claim 1 wherein said control element includes: a securing base; a cam wheel rotatably engaging with said securing base and connected to said control rod; a conducting plate and a conducting pin mounted on said securing base, engagable with said cam wheel and electrically connected to said internal circuit so that said cam wheel will force said conducting plate to contact with said conducting pin to switch on said internal circuit when said control rod is actuated to rotate.

3. A blind with a music box according to claim 2 wherein said cam wheel has the inner side thereof shaped to be a waveform guiding flange and said conducting plate has a bottom engagable with said waveform guiding flange so that said cam wheel will force said conducting plate to contact with said conducting pin when a peak portion of said waveform guiding flange engages with said bottom of said conducting plate.

4. A blind with a music box according to claim 1 wherein the power source of said music box includes two reflecting sheets disposed on the bottom of said top beam; a solar battery inductor mounted on said top beam between said two reflecting sheets; a reflecting sheet facing toward said two reflecting sheets and provided on the top of the slat which is most nearest to said top beam so that the solar energy is effectively introduced into said solar battery inductor by the reflection of lights between said reflecting sheets.

5. A blind with a music box according to claim 4 wherein said power source is said solar battery inductor in combination with an auxiliary mercury cell which serves as the power source of said music cell when said solar battery inductor is exhausting in power supplying.

* * * * *